Dec. 17, 1946.     F. L. ALBEN     2,412,853
DRIVE DEVICE
Filed March 23, 1945     2 Sheets-Sheet 1

WITNESSES:
E. A. McCloskey

INVENTOR
Frank L. Alben.
BY
ATTORNEY

Dec. 17, 1946. F. L. ALBEN 2,412,853
DRIVE DEVICE
Filed March 23, 1945 2 Sheets-Sheet 2

INVENTOR
Frank L. Alben.

Patented Dec. 17, 1946

2,412,853

UNITED STATES PATENT OFFICE 2,412,853

DRIVE DEVICE

Frank L. Alben, Pittsburgh, Pa., assignor to Westinghouse Electric Corporation, East Pittsburgh, Pa., a corporation of Pennsylvania Application March 23, 1945, Serial No. 584,327

3 Claims. (Cl. 105—131)

My invention relates, generally, to locomotive drives and, more particularly, to double-end quill drives of the flexible type.

Double-end flexible quill drives heretofore constructed have been provided with bearings of the sleeve type. Because of the large forces imposed upon the drives by excessive eccentricity of the quills with respect to the driving axles, the bearings become worn and pound out of shape, causing the gears and pinions to spread apart, which results in high maintenance expense for the motors and failures of the gears.

In order to overcome the foregoing difficulties, it has been proposed to utilize roller bearings in place of sleeve bearings. However, space limitations in certain locomotives preclude the use of roller bearings of the usual type.

An object of my invention, generally stated, is to provide a double-end flexible quill drive, which shall be simple and efficient in operation, and which may be economically manufactured and installed.

A more specific object of my invention is to provide a roller bearing quill drive which can be installed in a relatively small amount of space.

Another object of my invention is to provide a double-end roller bearing quill drive which may be assembled in the frame of an electric motor.

A further object of my invention is to provide a combined quill spider and gear center.

Other objects of my invention will be explained fully hereinafter, or will be apparent to those skilled in the art.

In accordance with one embodiment of my invention, a plurality of flexible cup units, containing resilient members, are disposed in a spider on each end of a quill to engage the spokes of the driving wheels, thereby transmitting the torque which drives a locomotive. One spider may be formed integrally with, or welded to, or bolted on, one end of the quill and the other spider is combined with the gear center which is pressed onto the other end of the quill. Roller bearings for the quill are mounted in a divided housing secured to the frame of the motor which drives the quill.

Figure 1:
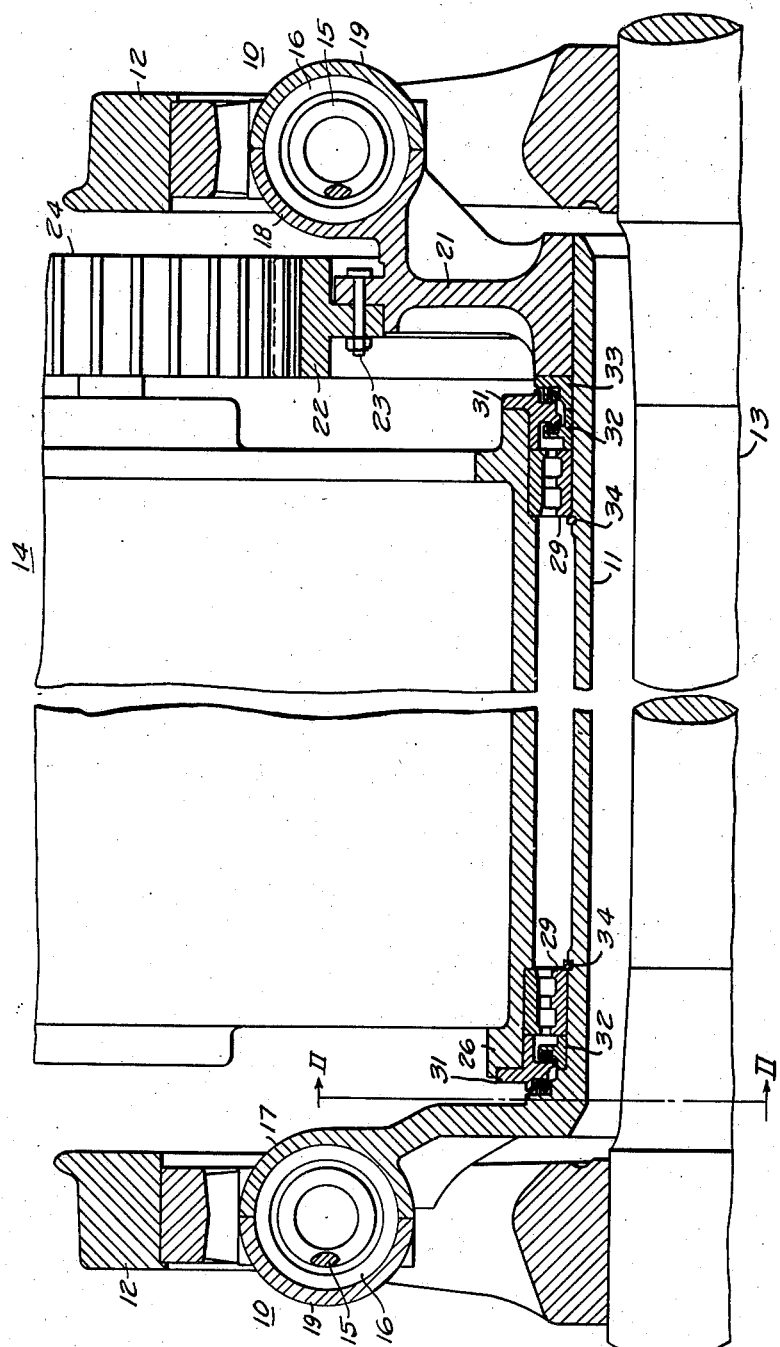
Figure 2:
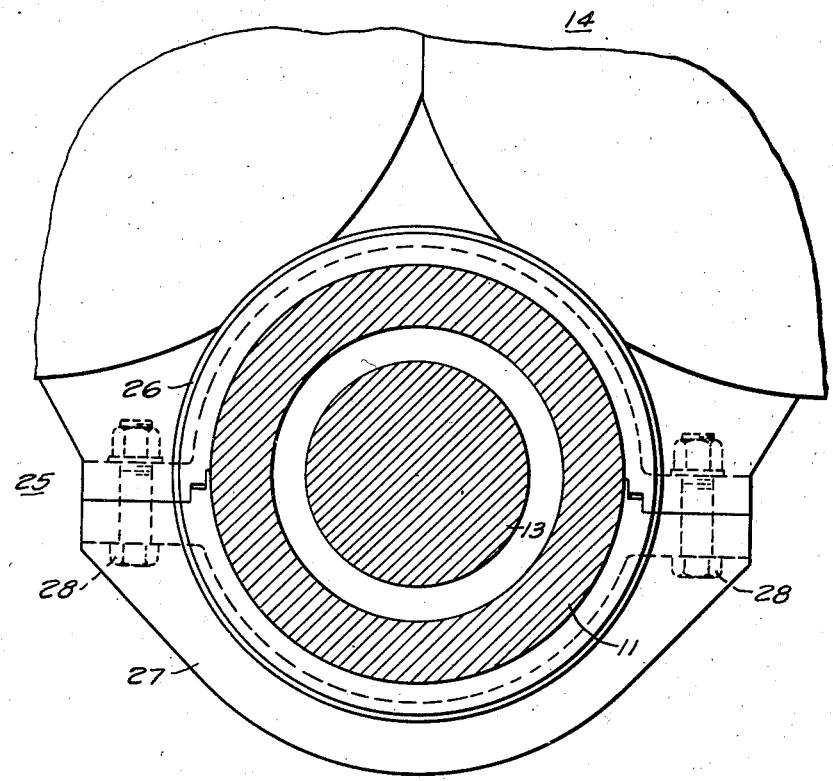

For a fuller understanding of the nature and objects of my invention, reference may be had to the following detailed description, taken in conjunction with the accompanying drawings, in which:

Figure 1 is a view, partially in elevation and partially in section, of a drive embodying my invention, and Fig. 2 is a view, partially in elevation and partially in section, the section being taken along the line II—II of Fig. 1.

Referring to the drawings, and particularly to Fig. 1, the drive shown therein comprises a plurality of flexible cup units 10, which are disposed at each end of a rotatable quill 11 to engage the spokes of driving wheels 12, which are secured to an axle 13 disposed inside of the quill 11. The torque for driving the wheels 12 is transmitted from a motor 14, which may be of the twin type as shown in Fig. 2, through the flexible cup units 10. The cup units comprise resilient members 15 which may be either steel springs, as shown, or may be composed of rubber. The resilient members 15 are disposed inside of cups 16, which are retained in spider arms 17 and 18 by removable caps 19.

As shown, the spider arms 17 at one end of the quill may be formed integrally with the quill 11 or welded to, or bolted on, the quill. The spider arms 18 at the other end of the quill are formed integrally with a gear center 21 which is pressed on the one end of the quill 11. A gear rim 22 may be attached to the gear center 21 by bolts 23 and is driven by a pinion 24 secured to the armature shaft of the motor 14. In the event that a twin motor is utilized, each armature shaft is provided with a pinion which engages the gear rim 22.

As shown most clearly in Fig. 2, the quill 11 is disposed in a divided housing 25 having an upper portion 26 secured to the frame of the motor 14, and a lower portion 27 removably attached to the upper portion 26 by bolts 28. As shown in Fig. 1, roller bearings 29, which are preferably of the double-roller type, are provided for the quill 11 at each end of the housing 25. The bearings 29 are retained in the housing 25 by bearing caps 31 which cooperate with retaining rings 32 and 33 to retain either oil or grease inside of the housing for lubricating the bearings 29.

The bearings 29, the caps 31 and retainers 32 and 33 may be assembled on the quill 11 prior to the pressing of the combined gear and spider 21 on the quill. Spring rings 34 or a spacing sleeve disposed between the two bearings may be provided for retaining the bearings 29 in their proper position on the quill 11. After the gear 21 is pressed on the quill, the quill and bearing assembly may be placed on the axle 13 and the wheels 12 pressed on the axle. The complete assembly may then be placed in the housing 25 and retained in position by bolting the lower portion 27 of the housing in position. If desired, the two bearings may be housed in a cartridge and the whole assembly applied to the motor, thereby simplifying the assembling of the drive.

Since the bearings 29 are of the double-roller type, their diameter may be reduced sufficiently to permit them to be installed in practically the same space as that required for sleeve bearings. Thus, a roller bearing quill drive may be utilized with motors previously designed for sleeve bearings.

Furthermore, since the quill spider arms 18 are combined with the gear center 21, a double end quill drive may be utilized and installed in the same space previously required for a single end quill drive. By utilizing a double end drive, the unit load on the cup and spring members is reduced to one-half of the load for a single end drive, thereby increasing the life of the drive and reducing the maintenance expense.

As previously explained, the distance between the gear and pinion centers is kept closer by utilizing roller bearings which will result in quieter operation and better distribution of gear tooth loads. The equal distribution of the load on the gear teeth will prevent excessive wear of the teeth, thereby reducing the maintenance expense on the gears.

Since the present drive requires no more space than single end quill drives having sleeve bearings, it may be installed without it being necessary to reduce the size of the propelling motors and without reducing the horsepower ratings of the motors. Thus, the present drive may be utilized with motors already designed or with newly designed motors having the same overall dimensions as motors previously built. The performance of a locomotive may be materially improved by utilizing a drive of the type herein described.

Since numerous changes may be made in the above-described construction, and different embodiments of the invention may be made without departing from the spirit and scope thereof, it is intended that all matter contained in the foregoing description or shown in the accompanying drawing shall be interpreted as illustrative and not in a limiting sense.

I claim as my invention:

1. In a locomotive drive, in combination, an axle, a wheel removably secured to each end of the axle, a rotatable quill surrounding the axle, a spider secured to one end of the quill, a combined spider and gear removably secured to the other end of the quill, a motor having a pinion for driving the gear, a housing extending the full length of the motor frame for the quill, roller bearings disposed at each end of the housing for the quill, said housing having space therein for a lubricant for said bearings, and resilient members disposed in said spiders to engage said wheels.

2. In a locomotive drive, in combination, an axle, a wheel removably secured to each end of the axle, a rotatable quill surrounding the axle, a spider secured to one end of the quill, a combined spider and gear removably secured to the other end of the quill, a motor having a pinion for driving the gear, a divided housing secured to the motor frame for the quill, roller bearings disposed at each end of the housing for the quill, said housing extending the full length of the motor frame and having space therein for a lubricant for said bearings, and resilient members disposed in said spiders to engage said wheels.

3. In a locomotive drive, in combination, an axle, a wheel removably secured to each end of the axle, a rotatable quill surrounding the axle, a spider secured to one end of the quill, an integral spider and gear center removably secured to the other end of the quill, a gear rim removably attached to the gear center, a motor having a pinion meshing with the gear rim, a divided housing secured to the motor frame for the quill, roller bearings disposed at each end of the housing for the quill, said housing extending the full length of the motor frame and having space therein for a lubricant for said bearings, and resilient members disposed in said spiders to engage the wheels.

FRANK L. ALBEN.